United States Patent [19]

Gerken

[11] 4,378,266
[45] Mar. 29, 1983

[54] BAG SEALER

[76] Inventor: Carl F. Gerken, 746 Foster Ave., Bensenville, Ill. 60106

[21] Appl. No.: 288,143

[22] Filed: Jul. 29, 1981

[51] Int. Cl.³ ............................................. B30B 15/34
[52] U.S. Cl. .................................. 156/359; 156/366; 156/583.9; 219/492; 219/508
[58] Field of Search .................. 156/583.8, 583.9, 358, 156/366; 100/93 P; 219/508, 510, 243, 492, 493, 494

[56] References Cited

U.S. PATENT DOCUMENTS

| | | | |
|---|---|---|---|
| 3,738,890 | 6/1973 | Johnson et al. | 100/93 P X |
| 4,082,941 | 4/1978 | Sukou et al. | 219/243 |
| 4,221,626 | 9/1980 | Clay | 156/583.8 X |
| 4,229,244 | 10/1980 | Swope | 156/583.9 X |

*Primary Examiner*—David A. Simmons
*Attorney, Agent, or Firm*—Hill, Van Santen, Steadman, Chiara & Simpson

[57] ABSTRACT

A device for sealing plastic material bags having opposed jaw members movable between open and closed positions with one of the jaw members provided with a heat source and the opposed jaw member provided with a resilient jaw surface. One of the jaw members is stationary, the other jaw member is movable and is attached adjacent one end of a lever member pivoted intermediate its ends, the other end being associated with an electro-magnet with switch means for actuating the electro-magnet, the switch being actuated by manual movement of the movable jaw towards the stationary jaw. Activation of the switch controls electronic circuitry including timing means to actuate the electro-magnet to forcibly close the jaws and maintain them in a closed condition until interruption of power to the electro-magnet by a timing circuit. The movable jaw is normally biased away from the stationary jaw. The heat means may be provided with two heat ranges, the timer circuitry with two timing circuits, and the resilient facing with interchangable faces whereby the device is readily adaptable to different bag styles.

8 Claims, 7 Drawing Figures

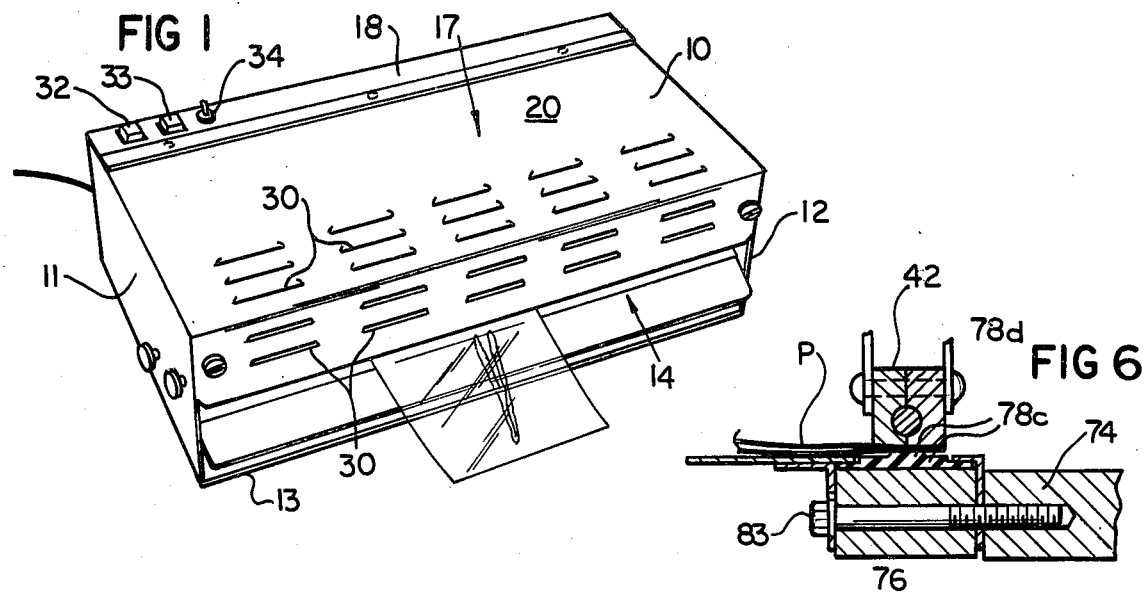
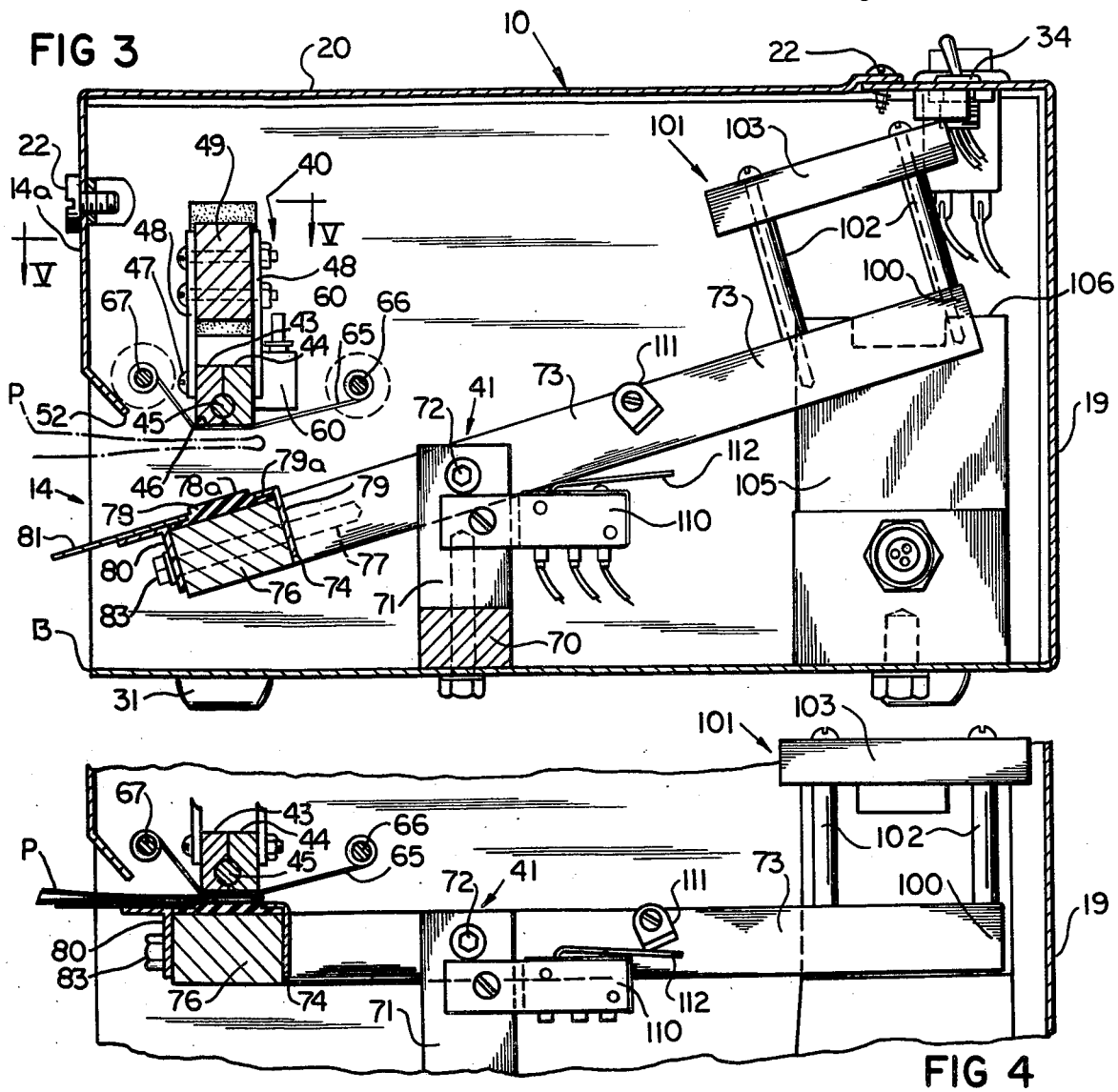

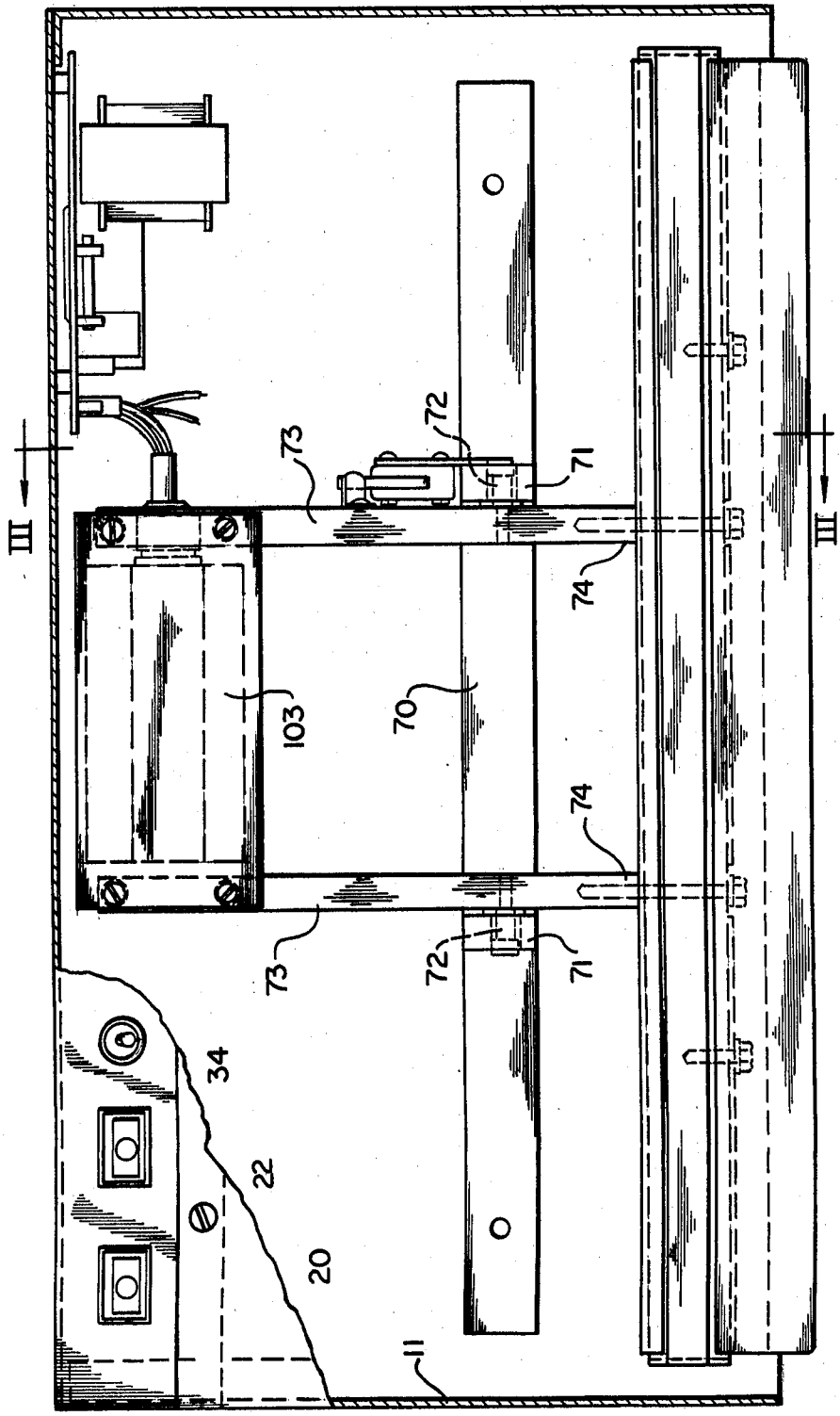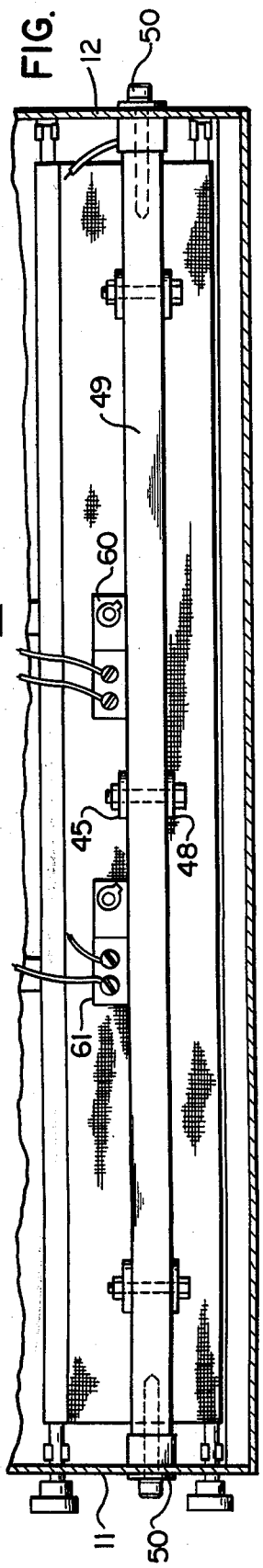

BAG SEALER

BACKGROUND OF THE INVENTION

1. Field of the Invention

This invention relates to heat sealing machines, and more particularly, to a machine for heat sealing thermoplastic material bags or pouches.

2. Prior Art

Small manually actuated heat sealing machines specifically designed for use with plastics materials pouches have been previously proposed. Such devices are used in closing plastic material pouches after items have been placed in the pouch. A typical use is found in hospitals and other areas where sterile items must be stored. Pouches for such items are normally either formed of thermoplastic material, or of combinations of paper or other fiber material and thermoplastic material, and must be sealed at one edge after insertion of the item in the pouch.

Such sealing devices normally utilize opposed jaw members with one of the jaw members being heated and the other jaw member being provided with a resilient facing. After the pouch or other item to be sealed is placed between the jaws, a mechanism is provided which is operator actuatable to cause the jaws to seat for a period of time. The period of time can either be determined by the time that an activating switch, such as a foot switch, is depressed, or it can be determined by the mechanism which holds the jaws closed.

An example of the latter type is shown in U.S. Pat. No. 4,229,244, where a gear motor is used to rotate a configured cam face against a cam follower on one end of a lever arm to force the other end towards the fixed jaw. The movable jaw is attached to the other end and is thus forced into engagement with the fixed heated jaw. As the cam face is rotated, a reduced radius section is presented to the cam follower allowing the jaw to drop away from the fixed jaw. Thus, the cycle time is controlled by the revolution time of the cam face.

Other devices have used other mechanisms for moving the movable jaw, such as, for example, an eccentric attachment of a link affixed to the movable jaw, or in larger production type machines, pneumatic or hydraulic cylinders actuated against the movable jaw. Some devices have allowed a selection of seal shapes by changing jaw faces.

Such prior machines have deficiencies in that (among others) the cycle time can vary, the mechanism used to force the jaws closed is subject to many variables or is quite expensive and susceptible to damage and in rigid connection systems the closure pressure varies greatly with pouch thickness.

Additionally, prior devices normally had only one predetermined cycle time and one predetermined heat setting. Different types of plastics material and different types of pouches may require both different heats, different seal areas, and different jaw closed dwell times. It would be an advance in the art to provide an improved heat sealer which is capable of being used with both of the common types of sterile plastic packaging, i.e. all plastic and part plastic and part paper, which is economical to manufacture and is reliable, where the cycle time is more precisely controlled, and where thick pouches will not result in potential damage.

SUMMARY OF THE INVENTION

This invention overcomes disadvantages of the prior art and provides a new and improved heat sealing machine. The invention, in its preferred embodiment, includes a fixed upper heated jaw member having a plurality of heat controlling sensors mounted in a housing, and a lower movable jaw member in the housing having a resilient jaw face which is easily changable to provide different sealing areas. The housing has an opening to provide access between the jaws.

The lower jaw face is mounted at one end of a pivoted lever. Part of an electro-magnet assembly is mounted at the second end of the lever with the lever being pivoted intermediate the ends about a pivot affixed to the housing. The other part of the electro-magnet assembly is affixed to the housing below the second end of the lever. The lever is biased to a normally open position, either by mechanical biasing such as a spring, or by location of the pivot to provide a gravity biasing. Switch means are positioned within the housing to be activated by manual movement of the lower jaw towards the upper jaw.

Control circuitry is provided to activate the electro-magnet upon activation of the switch to magnetically draw the second end of the lever downward thereby forcing the movable jaw surface into contact with the upper stationary jaw.

The circuitry of this invention provides for selection between at least two heat levels, and for at least two jaw closed dwell times.

It is therefore a principal object of this invention to provide an improved, manually actuated, powered, closing jaw heat sealer.

It is yet another, and more specific object of this invention to provide a manually actuated jaw heat sealer having an upper heated jaw and a lower movable jaw with power means to maintain the jaws closed and circuitry for allowing a choice of heat and a choice of jaw closure dwell times with automatic opening of the jaws upon completion of the dwell time.

It is yet another object of this invention to provide an improved manually actuated movable jaw heat sealer utilizing an electro-magnet to maintain the jaws in a closed position for a predetermined period of time which is activated upon manual movement of the jaw from an open rest position towards a closed position.

It is yet another specific object of this invention to provide a pouch heat sealer having a housing carried stationary upper jaw equipped with heat means, a movable lower jaw mounted on a pivoted lever pivotable between a lower open position and a raised closed position biased against the upper jaw, with means normally biasing the movable jaw to the lower open position, electro-magnetic means at an end of the lever opposite the movable jaw, switch means carried by the lever for actuating the electro-magnet to maintain the jaw in the closed position, and circuitry for controlling activation of the electro-magnet including timing means.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a partially elevational perspective view of the bag sealer of this invention.

FIG. 2, on page 2 to the drawings, is a partially sectional view of the sealer of FIG. 1 from the top thereof.

FIG. 3, on page 1 of the drawings, is a sectional view of the sealer of FIG. 2 taken along the lines III—III of FIG. 2.

FIG. 4 is a fragmentary view similar to FIG. 3 showing the closed jaw position.

FIG. 5 is a fragmentary sectional view taken along the lines V—V of FIG. 3 showing the top of the stationary jaw.

FIG. 6 is an enlarged sectional view of the jaw section showing a second resilient jaw face.

DESCRIPTION OF THE PREFERRED EMBODIMENT

Figure 7:
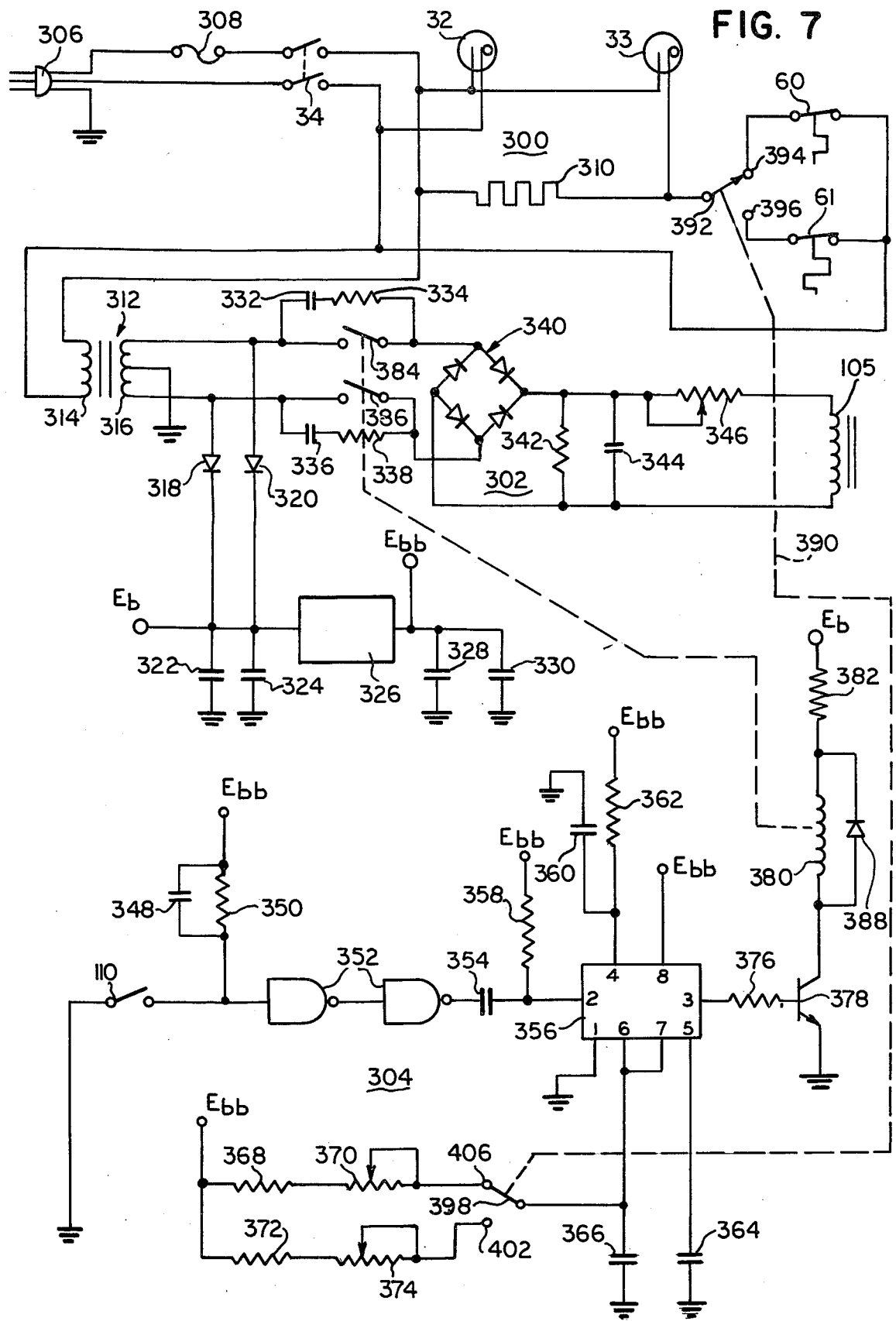
FIG. 7 is a schematic representation of a control circuit for the sealer of this invention.

As shown in FIG. 1, the sealer of this invention includes a housing 10 having sides 11 and 12, a bottom 13 and a partially open front 14. A top 17 includes a fixed rear section 18 affixed to the back wall 19, and a removable forward second 20 allowing access to the interior. The removable section 20, as illustrated in FIG. 3, may be affixed to the remaining portion of the housing by screws 22 or by other fastening means and can be, if desired, hinged for easy accessibility to the interior from the top thereof.

The opening 14 at the front extends from a front top part panel 14a to the bottom 13, although, of course, if it is desired, the bottom could be partially closed by a short upstanding wall. The top and top portion of the front wall are provided with air circulating openings 30 and the entire housing may rest on slip-proof legs 31. As illustrated in FIG. 1, the fixed top portion 18 can be provided with indicator lights 32 and 33, and with an on-off switch 34.

As best illustrated in FIG. 3, positioned interiorly of the housing 10, are a stationary upper jaw assembly 40 and a moving lower jaw assembly 41. The stationary upper jaw assembly includes a lowermost jaw block assembly 42 which, as illustrated, may be formed of two block members 43 and 44 with a heating element 45 entrapped therebetween. The assembly 42 has a lower face 46 forming the jaw surface. The assembly 42 is affixed by bolts or screw means 47 to bracket members 48 which are in turn affixed to a mounting bar 49 which, as illustrated in FIG. 5, is mounted to the sidewalls 11 and 12 by fastening means such as bolts 50 with the mounting bar 49 substantially spanning the distance between the sidewalls 11 and 12 adjacent the front. The jaw surface 46 is positioned approximately level with or slightly below the bottom 52 of the top portion 14a of the front which forms the top of the opening 14. In this manner, a pouch to be sealed P can be inserted into the opening to a point immediately below the jaw surface 46.

Affixed to the assembly 42 are a plurality of heat sensors 60 and 61 which are of the interruptor type which comprise normally closed switch means which, by means of a bimetallic strip or otherwise, open at a predetermined heat. The sensors 60 and 61 are set to open at different heat levels and may be adjustable. It is to be understood that although in the preferred embodiment illustrated, two heat levels are provided for the upper jaw, in other forms, if desired three or more discreet heat levels may be provided. In the preferred embodiment, specifically designed for use in connection with medical facilities which utilize, at present, either pouches having a sealing area formed entirely of thermoplastic or a sealing area formed partially of thermoplastic and partially of paper, only a dual heat machine is required with the heat levels chosen so that each level provides an optimum temperature setting for one form of pouch. However, in those situations where the device is to be used to seal more than two different types of pouches, where the additional pouch styles require attainment of yet another heat level, a third sensor can be provided for the upper jaw.

In order to prevent the pouch P from sticking to the upper jaw, a Teflon fabric 65 spans the upper jaw area from supply roller 66 to take-up roller 67, the rollers and Teflon fabric extending the length of the upper jaw.

The lower jaw assembly 41 includes a bottom mounting member 70 affixed to the bottom 13 of the housing. Spaced uprights 71 are positioned intermediate the mounting member ends 70 and affixed thereto. The uprights 71 provide mounts for pivot pins 72 which are journaled in lever arms 73, the lever arms 73 being spaced from one another and parallel thereto. At the forward ends 74 of the lever arms, an elongated lower jaw mounting block 76 is attached by means such as bolts 77. The lower jaw block 76 has positioned thereatop a resilient jaw face member 78 entrapped between flanged framing members 79 and 80 with the framing member 80 at the front of the mounting block 76 having a finger grip extension 81 projecting out through the open front 14 of the housing. The resilient jaw face 78 is easily changed by unbolting the front framing member 80 by means of bolts 83 and removing the framing member 80 to slip the reduced thickness portion of the resilient member out from beneath the flange 79a of the framing member 79. Thereafter, a second supplied resilient jaw facing member may be attached to the base 76. The resilient jaw facing member 78 has a raised central portion 78a having a relatively wide transverse span. As illustrated, however, in FIG. 6, a second resilient jaw facing member 78c can be provided with a narrower raised portion 78d. Since the pouch P will be entrapped between the upper jaw and the central raised portion 78a or 78d of the resilient lower jaw facing 78 or 78c, the transverse thickness of the raised portion will determine the sealed dimension. It has been found that different pouches are optimumly provided with different seal configurations. By providing for ease of exchangability of the lower jar resilient face, while providing a jaw face having a raised abutment surface, the overall sealing device can be easily modified to accomodate different types of pouches.

At the rear end 100 of the lever arms 73, one portion 101 of an electro-magnet assembly is attached by means of mounting posts 102. In the embodiment illustrated, a metal plate member 103 constitutes the one portion of the electro-magnet assembly attached to the lever arm with the plate member 103 substantially spanning the distance between the two lever arms 73. An electro-magnet 105 is positioned beneath the plate 103 intermediate the lever arms 73 and is affixed to the bottom 13 of the housing. The electro-magnet is dimensioned such that its top surface 106 is at a level within the housing such that when the plate 103 is drawn into contact with the surface 106, the lever arms 73 will be pivoted about the pivot points 72 to force the raised jaw face 78a of the movable jaw against the jaw surface 76 of the upper jaw with a predetermined force due to compressibility of the resilient surface 78. It will of course be understood by those skilled in the art that the jaw closed positioning of the surface 106 and the plate 103 may vary slightly due to the non-mechanical nature of the force moving the lever. The attractive force of the electro-magnet will not vary by a critical amount due to the existence of a short gap between the surface 106 and the plate 103. Thus, the jaw closure force is determined by the strength of the electro-magnet together with the lever arm spacing to the pivot 72. In this manner, unlike prior art mechanical devices, pouches having various degrees of thickness can be utilized while still maintaining an adequate sealing pressure even though the jaws are not completely closed due to the interposed thickness of the pouch to be sealed. Importantly, the use of an electro-magnet as the moving force assures that an excessive force against the jaws will not be created simply because the pouch is thicker thereby preserving the unit from damage.

Activation of the electro-magnet is provided for by a switch 110 and control circuitry. The switch 110 is mounted within the housing to be engaged by a switch striker 111 affixed to one of the lever arms 73. The lever arm is either biased by means such as a spring (not shown) or by positioning of the pivot to provide a gravity balance, to an open position as illustrated in FIG. 3 with the switch striker 111 out of contact with the switch actuating arm 112. Manual lifting of the lower jaw will bring the switch striker 111 into contact with the actuator arm 112 of the switch 110 thereby activating the control circuitry to energize the magnet to draw the jaw into the closed position shown in FIG. 4. The striker is positioned to require the jaws to be closed to a desired extent before closure of switch 110 to prevent actuation if a large object, such as a finger, is between the jaws.

The circuitry shown schematically in FIG. 7 provides selectability of both heat level and electro-magnet activated dwell time, the dwell time being chosen with respect to the heat level so that at a first heat level a first dwell time will be chosen and at a second heat level, a second dwell time. This variability coupled with the choice of jaw depth allows versatility in choice of pouch material.

The control circuitry illustrated in FIG. 7 comprises three interdependent components, in particular a heater circuit 300, an electro-magnet circuit 302, and a timing circuit 304.

The heater circuit comprises a plug 306 for connection to a commercial supply such as, for example, 120 VAC 60 HZ which is fused by way of a fuse 308 and supplied by way of the on-off switch 34 to the remainder of the control circuitry. A pilot indicator 32, for example, a neon lamp, is connected across the input lines. Also connected in series with the indicator 32 is a heater indicator 33, indicator 33 being connected in parallel to a heater 310. The indicator-heater combination is connected in series with a parallel-selected combination of heat sensors 60 and 61.

The electro-magnet circuit 302 is also connected to the power supply via the switch 34 and includes a voltage regulator for obtaining voltages for supplying the timing circuit 304. The electro-magnet circuit 302 comprises a step-down transformer 312 including a primary winding 314 and a center-tapped secondary winding 316. The terminals of the secondary winding 316 are connected by way of respective diodes 318 and 320, which may be IN 4004 diodes, to a junction for a supply voltage Eb tapped at a pair of capacitors 322 and 324 which are connected to a voltage regulator 326, for example, a LM 7805. The voltage regulator provides an operating potential Ebb of, for example, +5 VDC over a pair of capacitors 328 and 330.

The step-down transformer 312 may provide, for example, 24 VAC, 2 A, for the electro-magnet circuit. This AC voltage is supplied by way of a pair of resistor-capacitor combinations 332, 334, and 336, 338, to the input terminals of a diode bridge 340 and essentially cause a decrease of the potential operating voltage for the electro-magnet 105 in the quiescent state. The output of the diode bridge 340 is smoothed by way of a resistor 342 and a capacitor 344 and adjusted by way of a variable resistor 346 to that required for operating the electro-magnet 105.

The timing circuit 304 may be constructed in a plurality of ways. Here the activating switch 110 is connected to the input of the timer 356 by way of a quad AND gate, for example, a SN7400, suitably biased as recommended by the manufacturer, and provided with a suitable input pulse towards ground via a capacitor 348 and a resistor 350. The output of the quad AND gate is coupled by way of a capacitor 354 to the input of the timer 356, again suitably biased by the operating potential Ebb, a resistor 358, a capacitor 360 and a resistor 362. The timer may be a monoflop and is here provided by way of an LM555 CN manufactured by National Semiconductor, and illustrated with the pin designations of such manufacturer. In its timing mode, the astable mode of a monoflop, the time is set by way of a pair of RC circuits provided by a resistor 368, a variable resistor 370 and a capacitor 366 or by way of a resistor 372, a variable resistor 374 and the capacitor 366. The output of the timer 356 is connected by way of a resistor 376 to the base of a grounded-emitter transistor 378, which may be an MPS A13, which has a load comprising a winding 380 of a relay, a resistor 382 connected to an operating potential Eb and a diode 388 shutting the winding 380.

The relay 380 has a pair of contacts 384 and 386 which will be discussed below. By the same token, a mode switch 390 (schematically illustrated by a broken line) interconnects the timing circuit and the heating circuit so as to provide, in this example, two separate heats at respective dwell times. The mode switch 390 includes, in the heater circuit 300, a movable contact 392 for selectively connecting, via a stationary contact 394, the sensor 60 in series with the heater 310 or via a stationary contact 396, the sensor 61 in series with the heater 310. By the same token, the mode switch 390 includes another movable contact 398 for selectively connecting, via a stationary contact 400, the resistor 368 and the variable resistor 370 in circuit with the capacitor 366 or via a stationary contact 402, connecting the resistor 372 and the variable resistor 374 in circuit with the capacitor 366.

In operation, the on-off switch is actuated to power the unit and turn on the indicator 32. The mode switch 390 is operated to one position or the other, for example, the position illustrated, to select the heat defined by the sensor 60 and the corresponding heating or dwell time defined by the resistor 368, the variable resistor 370 and the capacitor 366.

The pouch to be sealed is then positioned for sealing and the lower jaw is raised so as to close the switch 110 and activate the timer 356 in accordance with the selected heating time defined by the resistor 368, the variable resistor 370 and the capacitor 366. The timer 356 immediately operates the relay 380, via the transistor 378 to close the contacts 384 and 386 and to provide full operating power to the full-wave rectifier 340 and, thus, activate the electro-magnet 105 which causes the lower jaw to be held against the upper jaw, with the pouch intervening, for the selected dwell time.

As the heater reaches the desired temperature, the indicator 33 is activated to indicate that the heater is operating. When the desired heat is attained, the selected sensor 60 opens to prevent overheating and, if necessary, closes again to complete the circuit to maintain heating at the proper level.

At the end of the desired heating time, set by the movable contact 398 of the mode switch 390, a reset potential has been generated by the timer 356 at the capacitor 366 to turn off the timer and deactivate the transistor 378. This causes the relay 380 to open its contacts 384 and 386 to deenergize the electro-magnet 105. Upon deenergization of the electro-magnet 105, the lower jaw is permitted to drop and open the activation switch 110. The control circuitry is now reset for the next operation. The next operation may involve a different heating time and a different heat; therefore, the mode switch 390 may be operated to the opposite position to select a different heat sensor and a different resistance for the RC timing combination 366-374.

I claim as my invention:

1. A heat sealing machine comprising an upper elongated stationary jaw having heating means, a lower movable elongated jaw movable between a first position spaced from the upper jaw and a second position biased against said upper jaw, first and second heat sensing means associated with heating means, first and second jaw face means associated with the lower jaw, the first and second face means having different transverse widths, an electro-magnet means for the lower jaw effective, when energized, to bias the lower jaw against the upper jaw, electro-magnet actuating means including switch means actuatable upon initial movement of the lower jaw from the first position towards the second position and control circuitry means for energizing the electro-magnet including first and second dwell time means for controlling time span of energization of the electro-magnet, said circuitry means including independent selection means for first and second subcircuits, selection of a first subcircuit actuates a first sensing means and a first dwell time and selection of a second subcircuit actuates a second heat sensing means and a second dwell time, the first and second heat sensing means set at different heat maintenance levels for the heating means and the first and second dwell time providing different energization periods.

2. The device of claim 1 wherein the lower jaw is affixed to a pivot arm assembly adjacent one end thereof, a first portion of the electro-magnet means affixed to the lever arm assembly adjacent an opposite end thereof and a pivot intermediate the ends.

3. The device of claim 2 wherein the sealer includes a housing having a part opened front, the upper and lower jaws positioned adjacent an opening through the front, the pivot affixed to a base of the housing intermediate a front and a rear of the housing, a second portion of the electro-magnet means including the electro-magnet affixed to the base adjacent the rear below the portion of the electro-magnet means affixed to the opposite end of the pivot arm assembly, the pivot positioned with respect to the ends of the pivot arm assembly such that the lower jaw is biased away from the upper jaw by gravity, said switch means having a first portion affixed to the pivot arm assembly and a second portion stationarily carried by the housing, the first portion and second portion of the switch means spaced from one another when the jaw is in the first position and contacting one another when the jaw is moved from the first position towards the second position to close the switch means and actuate the control circuitry.

4. The device according to claim 3, wherein the first and second portions of the electro-magnet assembly are spaced with respect to one another such that the lower jaw can abut the upper jaw prior to the first portion of the electro-magnet abutting the second portion of the electro-magnet whereby closure of the jaw is assured.

5. In a plastics bag heat sealing machine having opposed upper stationary and lower movable jaws with heat means for the upper jaw and resilient jaw face means for the lower jaw and control means including heat sensing means associated with the upper jaw for controlling the upper jaw heat level, the improvement of: said control means having high and low heat settings effective to maintain the upper jaw at a selected high or low heat level, first and second interchangeable resilient face means having different transverse face areas and means for exchanging the face means on the lower jaw whereby for a high heat level one of said face means is utilizible, and for a low heat level another of said face means is utilizible, first and second independent jaw closure timing means for timing closure of the jaws subsequent to activation of a jaw closure means, said first and second time closure means providing first and second dwell times, and means interconnecting the first and second heat sensing means with the first and second jaw closure time means whereby selection of a first heat sensing means activates a first closure time means and activation of a second heat sensing means activates a second jaw closure time means.

6. The device according to claim 8 wherein the jaw closure means includes an electro-magnet means having a stationary portion and a movable portion, the lower jaw including a jaw face carried adjacent one end of a pivoted lever mechanism, an opposite end of the pivotable lever mechanism having a second portion of the electro-magnet assembly affixed thereto, a pivot intermediate the ends of the lever mechanism, switch means partially carried by the lever mechanism, said switch means controlling circuitry for actuation of the electro-magnets, said circuitry including first and second circuit paths, switch means for selecting the first or second circuit path, said first heat sensing means and first jaw closure time means in said first circuit path, said second heat sensing means and said second jaw closure time means in said second circuit path, said jaw closure time means effective to deactivate the electro-magnet upon expiration of different time delays from activation of the switch means.

7. The device of claim 6 wherein the circuitry includes selectable first and second different time means.

8. The device of claim 7 including first and second different heating control means for limiting the heat level of the heating means.

* * * * *